US009141635B2

(12) United States Patent
Buzaski et al.

(10) Patent No.: US 9,141,635 B2
(45) Date of Patent: Sep. 22, 2015

(54) TRANSPARENTLY UPGRADING DERIVED DATABASE OBJECTS

(71) Applicant: Oracle International Corporation, Redwood Shores, CA (US)

(72) Inventors: George Buzaski, Fremont, CA (US); Murali Krishna Kumanduri, Hyderabad (IN); Mark Warren, Palo Alto, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 143 days.

(21) Appl. No.: 13/802,780

(22) Filed: Mar. 14, 2013

(65) Prior Publication Data

US 2014/0101650 A1     Apr. 10, 2014

Related U.S. Application Data

(60) Provisional application No. 61/707,823, filed on Sep. 28, 2012, provisional application No. 61/707,827, filed on Sep. 28, 2012, provisional application No. 61/707,840, filed on Sep. 28, 2012.

(51) Int. Cl.
*G06F 9/44* (2006.01)
*G06F 17/30* (2006.01)
*G06F 9/445* (2006.01)

(52) U.S. Cl.
CPC ............ *G06F 17/30174* (2013.01); *G06F 8/65* (2013.01); *G06F 8/67* (2013.01); *G06F 8/68* (2013.01); *G06F 17/30595* (2013.01)

(58) Field of Classification Search
USPC ......................................................... 717/170
See application file for complete search history.

(56) References Cited

U.S. PATENT DOCUMENTS 5,227,967 A    7/1993  Bailey
5,315,709 A    5/1994  Alston et al.
(Continued)

OTHER PUBLICATIONS

Lassen et al. Experiences with object oriented development in PlI! SQL, Center for Object Technology COT/4-18-V1.4, 2000.
(Continued)

*Primary Examiner* — John Chavis
(74) *Attorney, Agent, or Firm* — Vista IP Law Group, LLP

(57) ABSTRACT

A method for transparently upgrading derived database objects commences upon analysis of the data dictionary definition for an initial derived database object as compared to the data dictionary definition for a patched derived database object, then determining if a regenerated instance of the derived database object would be logically different from the initial derived database object. The determination is based on comparisons of the definitions of the initial derived database objects and patched definitions of respective database objects. The method produces a regenerated instance of the derived database object when a regenerated instance of the patched derived database object would be logically different from the initial derived database object. The method will suppress the production of a regenerated instance when a regenerated instance of the derived database object would not be logically different from the initial derived database object. Once regenerated or suppressed, a post-upgrade software application accesses the regenerated derived database object instance (if regenerated) or the initial derived database object if the regenerated instance was suppressed.

20 Claims, 8 Drawing Sheets

(56) References Cited

U.S. PATENT DOCUMENTS

| | | | |
|---|---|---|---|
| 5,440,743 | A | 8/1995 | Yokota et al. |
| 5,448,727 | A | 9/1995 | Annevelink |
| 5,555,388 | A | 9/1996 | Shaughnessy |
| 5,608,903 | A | 3/1997 | Prasad et al. |
| 5,640,550 | A | 6/1997 | Coker |
| 5,717,924 | A | 2/1998 | Kawai |
| 5,978,426 | A | 11/1999 | Glover et al. |
| 6,016,497 | A | 1/2000 | Suver |
| 6,122,630 | A | 9/2000 | Strickler et al. |
| 6,122,640 | A | 9/2000 | Pereira |
| 6,138,112 | A | 10/2000 | Slutz |
| 6,173,313 | B1 | 1/2001 | Klots et al. |
| 6,268,850 | B1 | 7/2001 | Ng |
| 6,304,867 | B1 | 10/2001 | Schmidt |
| 6,324,535 | B1 | 11/2001 | Bair et al. |
| 6,363,387 | B1 | 3/2002 | Ponnekanti et al. |
| 6,460,055 | B1 | 10/2002 | Midgley et al. |
| 6,480,848 | B1 | 11/2002 | DeKimpe et al. |
| 6,519,613 | B1 | 2/2003 | Friske et al. |
| 6,598,059 | B1 | 7/2003 | Vasudevan et al. |
| 6,611,848 | B1 | 8/2003 | Bradley |
| 6,633,870 | B1 | 10/2003 | Bradley |
| 6,633,883 | B2 | 10/2003 | Koskas |
| 6,681,225 | B1 | 1/2004 | Uceda-Sosa et al. |
| 6,745,209 | B2 | 6/2004 | Holenstein et al. |
| 6,769,124 | B1 | 7/2004 | Schoening et al. |
| 6,801,983 | B2 | 10/2004 | Abe et al. |
| 6,834,290 | B1 | 12/2004 | Pugh et al. |
| 6,965,899 | B1 | 11/2005 | Subramaniam et al. |
| 7,028,057 | B1 | 4/2006 | Vasudevan et al. |
| 7,080,371 | B1 | 7/2006 | Arnaiz et al. |
| 7,310,653 | B2 | 12/2007 | Coyle et al. |
| 7,350,191 | B1 | 3/2008 | Kompella et al. |
| 7,421,458 | B1 | 9/2008 | Taylor et al. |
| 7,574,461 | B1 | 8/2009 | Armorer et al. |
| 7,603,669 | B2 | 10/2009 | Curtis et al. |
| 7,689,587 | B1 | 3/2010 | Tiruveedi et al. |
| 7,693,889 | B1 | 4/2010 | Armorer et al. |
| 8,087,013 | B2 | 12/2011 | Kelly et al. |
| 8,793,230 | B2 | 7/2014 | Engelko et al. |
| 9,043,778 | B2 | 5/2015 | Lin et al. |
| 2002/0019972 | A1 | 2/2002 | Grier et al. |
| 2002/0087271 | A1 | 7/2002 | Rozenshtein et al. |
| 2002/0188600 | A1 | 12/2002 | Lindsay et al. |
| 2003/0041127 | A1 | 2/2003 | Turnbull |
| 2003/0154216 | A1 | 8/2003 | Arnold et al. |
| 2003/0217069 | A1 | 11/2003 | Fagin et al. |
| 2003/0229610 | A1 | 12/2003 | Van Treeck |
| 2004/0064487 | A1 | 4/2004 | Nguyen et al. |
| 2005/0015376 | A1 | 1/2005 | Fraser et al. |
| 2005/0108733 | A1 | 5/2005 | Bermudez et al. |
| 2005/0149475 | A1 | 7/2005 | Chkodrov et al. |
| 2005/0149920 | A1 | 7/2005 | Patrizi et al. |
| 2005/0154695 | A1 | 7/2005 | Gonzalez et al. |
| 2006/0015528 | A1 | 1/2006 | Hejlsberg et al. |
| 2006/0085457 | A1 | 4/2006 | Gelfand |
| 2006/0085465 | A1 | 4/2006 | Nori et al. |
| 2006/0130040 | A1 | 6/2006 | Subramanian et al. |
| 2006/0242381 | A1 | 10/2006 | Shatskih et al. |
| 2007/0038590 | A1 | 2/2007 | Vijayan et al. |
| 2007/0038651 | A1 | 2/2007 | Bernstein et al. |
| 2007/0079140 | A1 | 4/2007 | Metzger et al. |
| 2007/0106701 | A1 | 5/2007 | Periyasamy |
| 2007/0156849 | A1 | 7/2007 | Becker |
| 2007/0219951 | A1 | 9/2007 | Ahmed et al. |
| 2008/0098046 | A1 | 4/2008 | Alpern et al. |
| 2008/0201701 | A1 | 8/2008 | Hofhansl et al. |
| 2010/0110474 | A1* | 5/2010 | Coulter et al. ............... 358/1.15 |
| 2012/0222025 | A1 | 8/2012 | Pandit |

OTHER PUBLICATIONS

Object Cache Navigation, Oracle Call Interface PRogrammer's Guide, Release 2 (9.2), Part No. A96584-10, 1996,2002.

Date et al, A Guide to SQL/DS, 1989, Addison-Wesley, Chapter 10.
Quest Software, Inc., LiveReorg.RTM, "Reorganization for the 24.times.7, Database," 2001.
Paapanen, Eric et al., "Oracle Database Application Developer's Guide-Large Objects", l0g Release 1 (10.1), Part No. B1079601, Apr. 21, 2008, 668 pages.
Smith, Jeff, "The Shortest, Fastest, and Easiest way to compare two tables in SQL Server: Union!", Jeffs SQL Server Blog 10, Apr. 22, 2008, 45 pages.
T-SQL, "sp_rename (T-SQL)", printed Apr. 22, 2008, 3 pages.
Non-final Office Action dated Mar. 8, 2010 for U.S. Appl. No. 11/875,478.
Advisory Action dated Jan. 26, 2010 for U.S. Appl. No. 11/444,571.
Davidson, Tom, Managing Schema Changes (Part 2), MSSQL Server Development Customer Advisory Team, Mar. 31, 2006, Microsoft Cororation. Nov. 19, 2000 <http://blogs.msdn.com/sqlcat/archive/2006/O3/31/566046.aspx>.
Ambler, Scott, and Pramod Sadalage. Refactoring Databases: Evolutionary Database Design. Mar. 3, 2006.
Final Office Action dated Aug. 30, 2010 for U.S. Appl. No. 11/875,478.
Notice of Allowance dated Mar. 21, 2011 for U.S. Appl. No. 11/444,571.
Final Office Action dated Dec. 7, 2010 for U.S. Appl. No. 11/201,797.
Final Office Action dated Sep. 8, 2011 for U.S. Appl. No. 11/801,495.
Scott Ambler et al., "Refactoring Databases: Evolutionary Database Design", Mar. 3, 2006, 7 pages.
Tom Davidson, Managing Schema Changes (Part 2), MSSQL Server Development Customer Advisory Teach, Mar. 31, 2006, Microsoft Corporation, Nov. 19, 2000, http: //blgs.msdn.com/squlcat/archive/2006/03/31/566046.aspx, 11 pages.
Non-final Office Action dated Jan. 31, 2012 for U.S. Appl. No. 11/875,478.
Final Office Action dated Jan. 25, 2012 for U.S. Appl. No. 11/201,797.
Non-final Office Action dated Jun. 27, 2012 for U.S. Appl. No. 11/875,478.
Final Office Action dated Jan. 29, 2013 for U.S. Appl. No. 11/875,478.
Advisory Action dated Mar. 8, 2013 for U.S. Appl. No. 11/875,478.
Final Office Action dated Mar. 29, 2013 for U.S. Appl. No. 11/801,495.
Notice of Allowance dated Jun. 12, 2013 for U.S. Appl. No. 11/875,478.
Non-final Office Action dated Jul. 31, 2014 for U.S. Appl. No. 13/802,794.
Non-final Office Action dated Nov. 20, 2014 for U.S. Appl. No. 13/802,785.
Final Office Action dated Jan. 16, 2015 for U.S. Appl. No. 13/802,794.
"Oracle OLAP", Oracle, Jan. 3, 2012, 2 pages url: http://www.oracle.com/technetwork/database/options/olap/index.html.
"Introduction to Analytic Workspaces", Oracle OLAP DML Reference, 11g Release 1 (11.1), Part No. B28126-03, Oracle, Mar. 18, 2013, 2 pages url: http://docs.oracle.com/cd/B28359 01/olap.111/b28126/dml basics004.htm.
Non-final Office Action dated Feb. 12, 2015 for U.S. Appl. No. 13/802,774.
Alan Choi, "Online Application Upgrade Using Edition-Based Redefinition", 2009, ACM.
Non-final Office Action dated Feb. 12, 2015 for U.S. Appl. No. 13/802,791.
Non-final Office Action dated Mar. 27, 2015 for U.S. Appl. No. 13/802,771.
Non-final Office Action dated May 21, 2015 for U.S. Appl. No. 13/802,794.
Final Office Action dated Jun. 1, 2015 for U.S. Appl. No. 13/802,785.
Final Office Action dated Jul. 8, 2015 for U.S. Appl. No. 13/802,774.
Final Office Action dated Jul. 14, 2015 for U.S. Appl. No. 13/802,791.

* cited by examiner

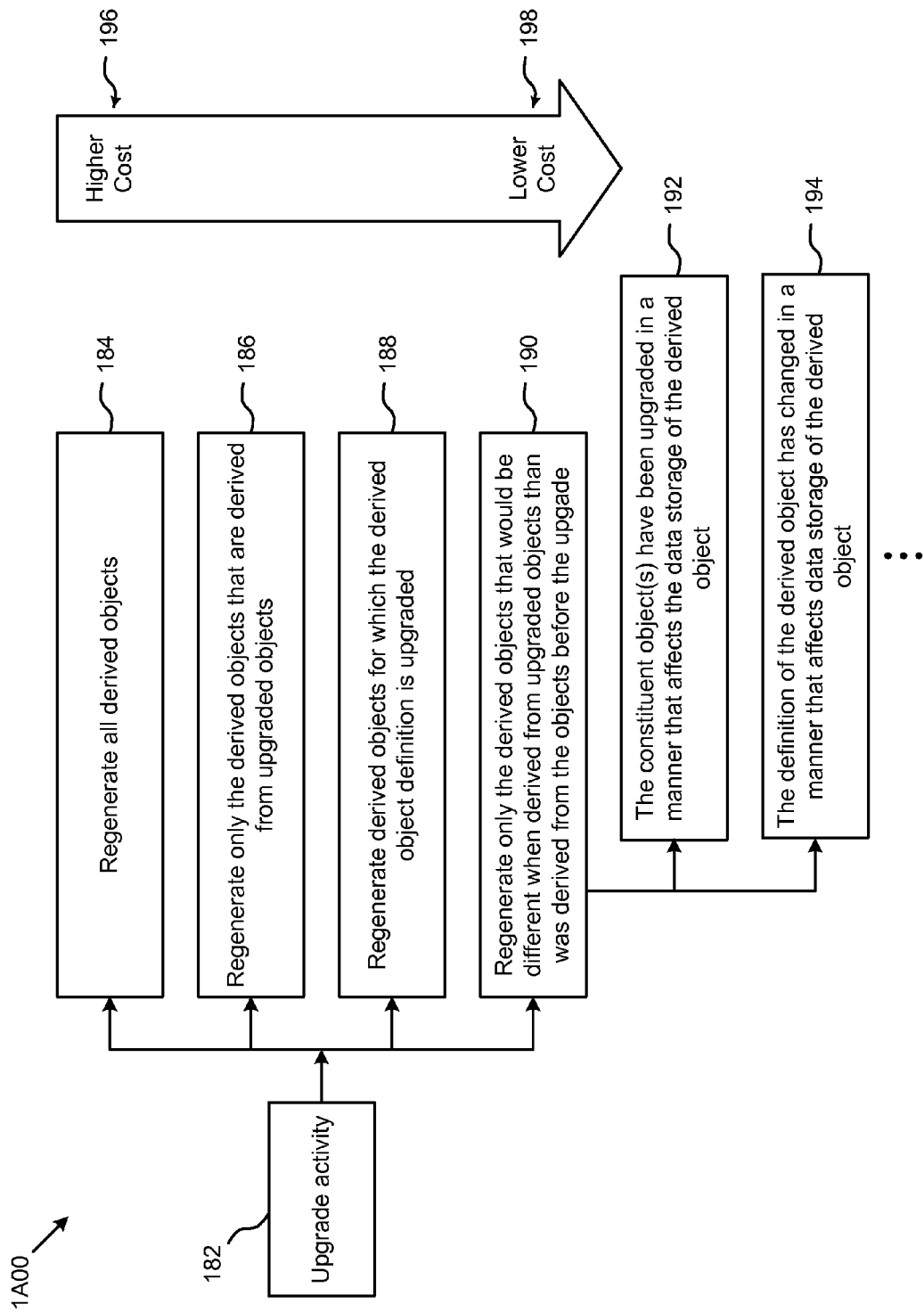

TRANSPARENTLY UPGRADING DERIVED DATABASE OBJECTS

RELATED APPLICATIONS

The present application claims the benefit of priority to U.S. Provisional Patent Application Ser. No. 61/707,823, entitled "ONLINE PATCHING ORCHESTRATION", filed on Sep. 28, 2012, and U.S. Provisional Patent Application Ser. No. 61/707,827, entitled "CONFIGURATION CHANGE DETECTION AND PROPAGATION ", filed on Sep. 28, 2012, and U.S. Provisional Patent Application Ser. No. 61/707,840, entitled "SYNCHRONIZING DOMAIN CONFIGURATION PARAMETERS ", filed on Sep. 28, 2012; which are all hereby incorporated by reference in their entireties, and the present application is related to co-pending U.S. patent application Ser. No. 13/802,771, entitled "USING A DATA DICTIONARY TO DETERMINE AN UPGRADE EDITION OF A RELATIONAL DATABASE TABLE", filed on even date herewith, which is hereby incorporated by reference in its entirety; and the present application is related to co-pending U.S. patent application Ser. No. 13/802,774, entitled "ONLINE UPGRADING OF A DATABASE ENVIRONMENT USING TRANSPARENTLY-PATCHED SEED DATA TABLES", filed on even date herewith, which is hereby incorporated by reference in its entirety; and the present application is related to co-pending U.S. patent application Ser. No. 13/802,785, entitled "USING CONFIDENCE VALUES FOR SYNCHRONIZING FILE SYSTEMS", filed on even date herewith, which is hereby incorporated by reference in its entirety; and the present application is related to co-pending U.S. patent application Ser. No. 13/802,791, entitled "REDUCING DOWNTIME DURING UPGRADES OF INTERRELATED COMPONENTS IN A DATABASE SYSTEM", filed on even date herewith, which is hereby incorporated by reference in its entirety; and the present application is related to co-pending U.S. patent application Ser. No. 13/802,794, entitled "SYNCHRONIZATION OF CONFIGURATION CHANGES BETWEEN APPLICATIONS AND THEIR PLATFORMS", filed on even date herewith, which is hereby incorporated by reference in its entirety.

Certain aspects in some embodiments of the present application are related to material disclosed in U.S. patent application No. 11/875,478 entitled "LOW-DOWNTIME AND ZERO-DOWNTIME UPGRADES OF DATABASE-CENTRIC APPLICATIONS" filed on Oct. 19, 2007, the content of which is incorporated by reference in its entirety in this Application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of upgrading database systems and more particularly to techniques for transparently upgrading derived database objects.

BACKGROUND

Reducing downtime of computing systems while upgrading is a goal that has been long sought after. Legacy approaches have attempted to address the problem by selecting and deploying different techniques to upgrade the different types of data found in an installation. For example, legacy techniques have provided for upgrade of a system of software applications by up-revving the files containing the application software code followed by a "restart" (e.g., of the application or of the operating system). Other legacy techniques have approached the task of upgrading a relational database by shutting down or otherwise controlling access to the relational database objects for a duration, then copying the database objects in their entirety in order to apply patches to the copy, and then restarting the upgraded relational database with the patched copies of the database objects, and finally restarting the up-revved application software code that would refer to the patched copies of the database objects.

These legacy techniques place a substantial burden on the application code developers. Moreover, as the sheer number and size of the database objects to be upgraded increases, this makes the upgrade cycle more expensive, and legacy techniques become deficient. The legacy techniques emerge as even more deficient when considering that modern database environments often implement a wide range of "derived objects"—objects that are derived from one or more underlying database objects such as tables. For example, a database might hold a database table in the form of a series of columns that hold all mobile phone numbers and corresponding subscriber data for all mobile phone subscribers in the USA. A corresponding derived object in the form of an index might provide for fast searching and access to, for example, all table rows referring to subscribers who are 18 years of age or younger. The derived objects can become very large, sometimes even as large (or larger) than the underlying database object(s).

Thus, applying legacy techniques that merely regenerate all derived objects during an upgrade cycle becomes too expensive or even prohibitive. Improved techniques are needed, and none of the aforementioned legacy technologies have the capability to perform the herein-disclosed techniques for transparently upgrading derived database objects. Therefore, there is a need for improved approaches.

SUMMARY

The present disclosure provides an improved method, system, and computer program product suited to address the aforementioned issues with legacy approaches. More specifically, the present disclosure provides a detailed description of techniques used in methods, systems, and computer program products for transparently upgrading derived database objects.

A method for transparently upgrading derived database objects commences upon analysis of the data dictionary definition for an initial derived database object as compared to the data dictionary definition for a patched derived database object or it underlying components, then determining if a regenerated instance of the derived database object would be logically different from the initial derived database object. The determination is based on comparisons of the definitions of the initial derived database objects and patched definitions of respective database objects. The method produces a regenerated instance of the derived database object when a regenerated instance of the patched derived database object would be logically different from the initial derived database object. The method will suppress the production of a regenerated instance when a regenerated instance of the derived database object would not be logically different from the initial derived database object. Once regenerated or suppressed, a post-upgrade software application accesses the regenerated derived database object instance (if regenerated) or the initial derived database object if the regenerated instance was suppressed.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

FIG. 1A is a schematic of a selector used in systems capable of transparently upgrading derived database objects, according to some embodiments.

DETAILED DESCRIPTION

Figure 1B:
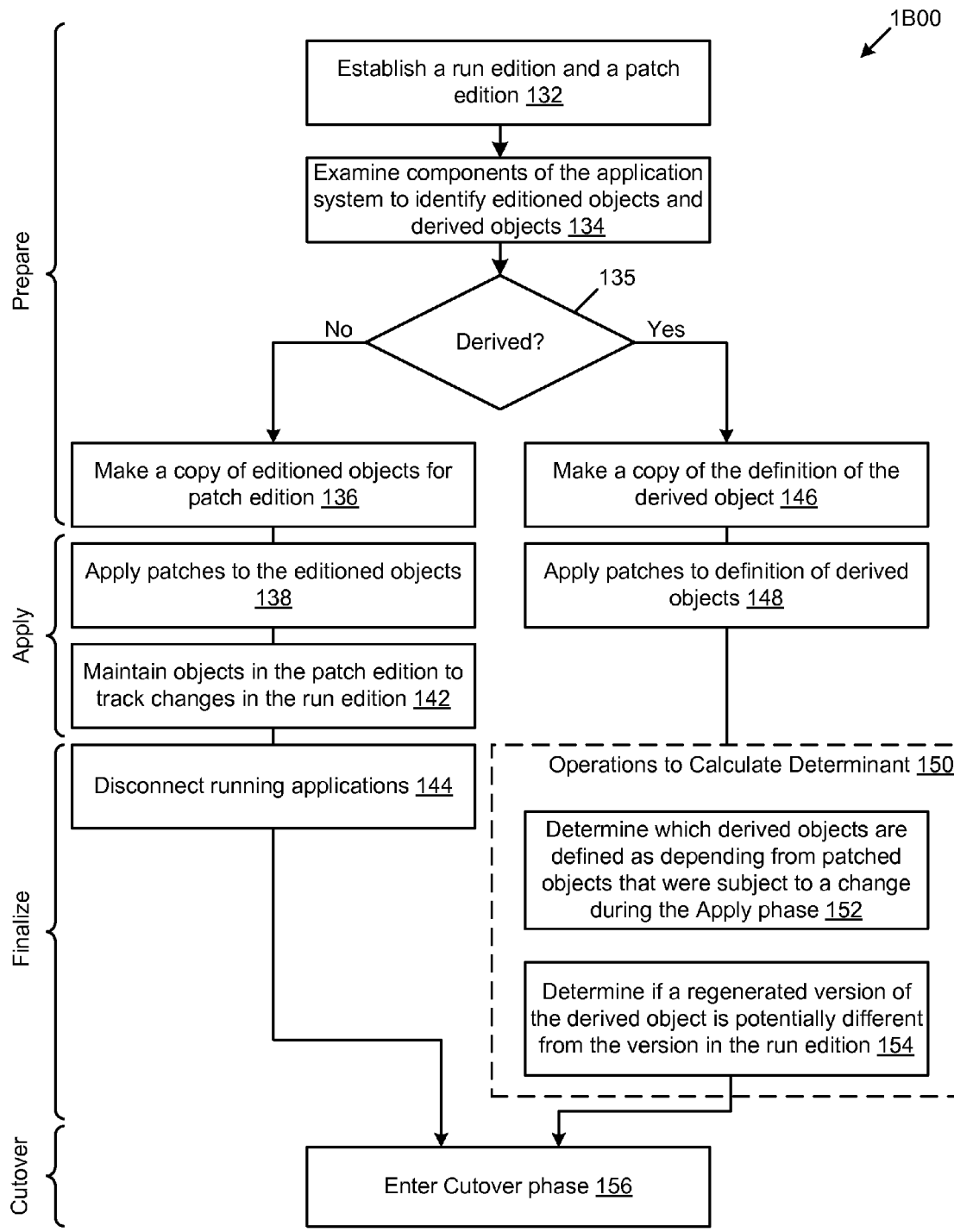
FIG. 1B is a diagram of a process flow including calculating a determinant as used in systems capable of transparently upgrading derived database objects, according to some embodiments.

Some embodiments of the present disclosure are directed to an improved approach for implementing transparently upgrading derived database objects. More particularly, disclosed herein and in the accompanying figures are exemplary environments, methods, and systems for implementing transparently upgrading derived database objects.

Overview

As earlier indicated, reducing downtime of computing systems while upgrading is a goal that has been long sought after. Accordingly some approaches for reducing downtime of computing systems while upgrading implement the techniques of "online patching". The techniques of online patching serve to reduce the duration of time between when the 'old' production system (e.g., a run edition) is shut down to the time when the 'new' production system (e.g., the patched system) is brought online.

Strictly as an example scenario, an application system (e.g., comprising software applications, a file system, and a database) might be the subject of an upgrade. The upgrade might be performed by traversing through several successive phases during which phases data is prepared (e.g., in a "Prepare" phase), patches to the application system (e.g., patches to the applications, patches to the file system, patches to the database objects, patches to the database schema, etc.) are applied (e.g., in an "Apply" phase), and then, the old applications shut down so that the patched applications and patched database objects (and other patched items) can be made active (e.g., in a "Cutover" phase).

Making copies of database objects (e.g., to form a system of editioned objects) to which patches are applied partially addresses the sought-after objective of reducing downtime of computing systems while upgrading. However since derived objects can be voluminous both in terms of number of derived objects, and in terms of the size of the derived objects—thus possibly incurring long down-times as the derived objects are copied—it becomes apparent that the legacy techniques of copying or regenerating all of the derived objects fall short. Worse, the system impact (e.g., size, computational intensity) of copying or regenerating a given derived object might not be known, or might not even be reasonably calculable before creation, thus the expense of making copies of derived objects is to be avoided.

Advanced techniques as disclosed herein discuss various heuristics and quantitative determinants, upon which determinants a decision can be taken. For example, based on a determinant, a decision can be taken to regenerate a derived object or, in a possible alternative, to instead merely reference an earlier-generated derived object or, in another alternative, to apply a patch to an earlier-generated derived object.

The determinants can involve application of coarse-grained rules, fine-grained rules, and/or Boolean tests, and/or determinants can involve application of heuristics that are applied based on the nature of the upgrade of the underlying database objects, and/or the nature of changes (e.g., patches) to the definition of a derived object.

Thus, transparently upgrading derived database objects demands development of advanced techniques, which advanced techniques are discussed in this disclosure.

Definitions

Some of the terms used in this description are defined below for easy reference. The presented terms and their respective definitions are not rigidly restricted to these definitions—a term may be further defined by the term's use within this disclosure.

The term "editioned table" or "editioned tables" refers to physical tables that have a striping column to contain an edition identifier.

The term "edition trigger" refers to an operation where a change to an editioned table is detected as pertaining to a table in a first edition, and the change is propagated to effect a change to a second edition in the same table.

The term "pre-upgrade software application" refers to a version of a software application code prior to being upgraded (e.g., via a patch, or version-up replacement).

The term "upgraded software application" refers to a version of a software application code after being upgraded (e.g., via a patch, or version-up replacement).

The term "data dictionary" refers to a group of data structures comprising entries that codify the data representation of the physical tables and other objects within a relational database system. As merely one example, a data dictionary can include information about the structure, definition, status, and relationships, etc. for any/all objects in the database. A data dictionary can further comprise information relating logical definitions and any relationships with any corresponding physical storage tables.

A "run edition" refers to a to-be-upgraded database edition used by the running application.

A "patch edition" refers to a database edition upon which patching actions execute. If a patch edition exists, it is the direct child of a run edition.

An "old edition" refers to any ancestor of a run edition.

The term "logic" means any combination of software or hardware that is used to implement all or part of the embodiments of the present disclosure.

A "module" includes any mix of any portions of computer memory and any extent of circuitry including hardwired logic or circuitry embodied as a processor.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

As earlier indicated, derived objects can be voluminous both in terms of number of derived objects, and in terms of the size of the derived objects, and in some cases the system impact (e.g., size, computational intensity) of copying or regenerating a given derived object might not be known, or might not even be reasonably calculable before creation, thus the expense of making copies of derived objects is to be avoided. Further, a developer may wish to specify the definition of a derived object in terms of some underlying or pre-existing logical schema. Some derived objects are implemented using definitions based on physical schema, and, in some cases the physical schema may not change during online patching, or the physical schema may change in ways that do not affect the logical schema. The herein-disclosed techniques can automatically detect when the logical-to-physical schema mapping has changed in a manner that would impact a particular derived object, and can accordingly regenerate the affected object.

Reference is now made in detail to certain embodiments. The disclosed embodiments are not intended to be limiting of the claims.

DESCRIPTIONS OF EXEMPLARY EMBODIMENTS

FIG. 1A is a schematic of a selector 1A00 used in systems capable of transparently upgrading derived database objects. As an option, the present selector 1A00 may be implemented in the context of the architecture and functionality of the embodiments described herein. Also, the selector 1A00 or any aspect therein may be implemented in any desired environment.

As shown, the flow of the schematic begins with an upgrade activity 182. For example, a system administrator would determine that an application system (e.g., an application system having a database component such as a relational database) should be upgraded. In the scope of the embodiments described herein, the system administrator makes the decision to commence the upgrade, and the techniques of the present disclosure serve to transparently upgrade derived database objects (as well as perform other upgrade tasks).

As is known in the art, derived objects can come in the form of specialized data structures that serve to improve performance or functionality. Strictly as examples, Table 1 presents a non-exhaustive listing of derived object types.

TABLE 1

| Non-exhaustive listing of derived object types | |
|---|---|
| Type Name | Exemplary Function |
| Indexes | Fast look-up of rows matching certain criteria |
| Materialized Views | Cached query results for higher performance of repeated operations |
| Text Search Indexes | Fast lookup of text locations matching certain criteria |
| Analytic Workspaces | Multi-dimensional analysis of aggregated data |

The selector 1A00 is depicted as showing an aspect of cost for performing one or another selected technique for handling of a derived object upgrade. For example, a higher cost 196 would likely be incurred as a result of selecting to regenerate all derived objects (see operation 184) as compared with a lower cost 198 that would likely be incurred as a result of selecting to regenerate only the derived objects that would be different when derived from upgraded database objects than was derived from the objects before the upgrade (see operation 190).

Other options are possible. For example, it is possible to regenerate only the derived objects that depend on objects that were upgraded (see operation 186), and it is possible to regenerate the derived objects for which the derived object definition was the subject of an upgrade or patch (see operation 188).

Returning to the discussion of operation 190, when determining if a derived object would be logically different when derived from upgraded database objects than was derived from the objects before the upgrade, certain criteria can be applied, and determinations can be reached based on quantitative, and/or analytic, and/or heuristic measures. For example, it is possible that even though the constituent object(s) of a subject derived database object had been upgraded, it can be determined (see operation 192) whether or not they were upgraded in a manner that does affect the data storage of the derived object. In a case that they were upgraded in a manner that does not affect the logical equivalence (e.g., does not affect data storage) it may be possible to skip or otherwise suppress the regeneration of the subject derived database object. Table 2 serves as a non-exhaustive listing of candidate upgrades/changes that might occur, but might not require regeneration of the subject derived database object(s).

TABLE 2

| Candidate upgrades/changes | |
|---|---|
| Changes Considered in Determinants | Description/Example/Comment |
| Cosmetic changes to the logical definition | Formatting, comments, or ordering of commutative clauses (e.g., "where X = Y" is the same as "where Y = X"). |

TABLE 2-continued

Candidate upgrades/changes

| Changes Considered in Determinants | Description/Example/Comment |
|---|---|
| Cosmetic changes to any objects referenced by the logical definition | Formatting, comments, or ordering of commutative clauses (e.g., "where X = Y" is the same as "where Y = X"). |
| Changes to portions of referenced objects which are not referenced by logical definitions | Example: A materialized view query references EXAMPLE_TABLE columns X and Y. If EXAMPLE_TABLE is upgraded with new column Z, then if this new column Z is not referenced by a materialized view query then it follows that the new column does not change the derived materialized view implementation. |
| Changes to the logical definition and one or more referenced objects that, when combined, produce no net effect on the generated derived object | Example: A logical definition references physical table EXAMPLE_TABLE. In an upgrade cycle, a synonym for EXAMPLE_TABLE is created called BACKUP_TABLE and the logical definition is changed to reference the BACKUP_TABLE synonym. Although the logical definition was changed, the required derived object implementation remains unchanged. |

As another example, the definition of the derived object itself might have been changed in an upgrade cycle. In many cases the mere fact that the definition had changed does not necessarily mean that the derived object necessarily need be regenerated. For example it is possible to determine (see operation 194) that only the access technique might have changed. Or it is possible that only the format of stored data might have changed. For example, a date might have been stored using a MM/DD/YYYY format, and is upgraded to use a Julian calendar date format (e.g., for storage space considerations), yet the comparator of the derived object operates in a manner that is agnostic to the format. In such cases and others it is theoretically possible to skip regeneration of the derived object, however an appropriate set of rules and/or heuristics need to be applied in order to make such a determination in the face of the actual changes detected.

FIG. 1B is a diagram of a process flow 1B00 including calculating a determinant as used in systems capable of transparently upgrading derived database objects. As an option, the present process flow 1B00 may be implemented in the context of the architecture and functionality of the embodiments described herein. Also, the process flow 1B00 or any aspect therein may be implemented in any desired environment.

As shown, process flow 1B00 commences when a system administrator determines to perform an online patch cycle. The progression through an exemplary online patch cycle would identify the bounds of a production system (e.g., a run edition), and would establish a patch edition (see operation 132). Further procession through the phases (e.g., a Prepare phase) of an online patch cycle would cause various components of the application system (see FIG. 1C) to be examined in order to identify editioned objects and non-editioned objects such as indexes, materialized views, and other derived objects (see operation 134). Based on the nature of the examined object, one or another path may be taken based on one or more analytical qualifications of the examined object (see decision 135). For example, if the object is qualified as an editioned object then one path is taken. If the object is a derived object then another path is taken. Now, considering the case (as shown on the left arm of FIG. 1B) some objects (e.g., editioned objects) are copied in preparation for applying one or more patches (see operation 136), and then the patch is applied (see operation 138). Such editioned and patched objects are maintained in the patch edition (see operation 142), possibly using cross-edition triggers to maintain coherency of changes while the run edition is in operation. At some point a next phase is entered (see "Finalize" phase), during which phase running applications are disconnected (see operation 144) and a Cutover phase is entered (see operation 156).

Again, based on the nature of the examined object, one or another path may be taken. For example, if the object is a derived object then another path is taken. Now, considering the case (as shown on the right arm of FIG. 1B) some objects are deemed as derived objects, and certain steps are taken on that object in order to transparently upgrade derived database objects. For example, a copy of the definition of the derived object is made (see operation 146), and one or more patches are applied to the definition of the derived object (see operation 148). Those skilled in the art will recognize that the definition can come in any form of a schema, or in any form of a data structure definition, or other metadata. In exemplary embodiments, the definition of a derived object may be specified using metadata, using declarations (e.g., in structured language such as SQL), using procedural code (e.g., program code), or any combinations thereof. A derived object definition can be specified at the logical level and may (or may not) reference other editioned code or other data objects in the application system.

Continuing with the discussion of the right branch of FIG. 1B, operations to calculate a determinant (see operation 150) are commenced, which determinants serve to determine which derived objects are defined as depending from patched objects that were subject to a change during the Apply phase (see operation 152). And/or one or more determinants serve to determine if a regenerated version of the derived object would be potentially different from the version in the run edition. In the case that the derived object would be different, then an operation to regenerate is commenced and a newly regenerated derived object is stored in the patch edition.

In some cases, the performance of operation 152 and the performance of operation 154 conclude the Apply phase, and the flow drops into the Finalize phase, as shown. The foregoing can result in an editioned database installation such as is shown in FIG. 1C.

Figure 1C:
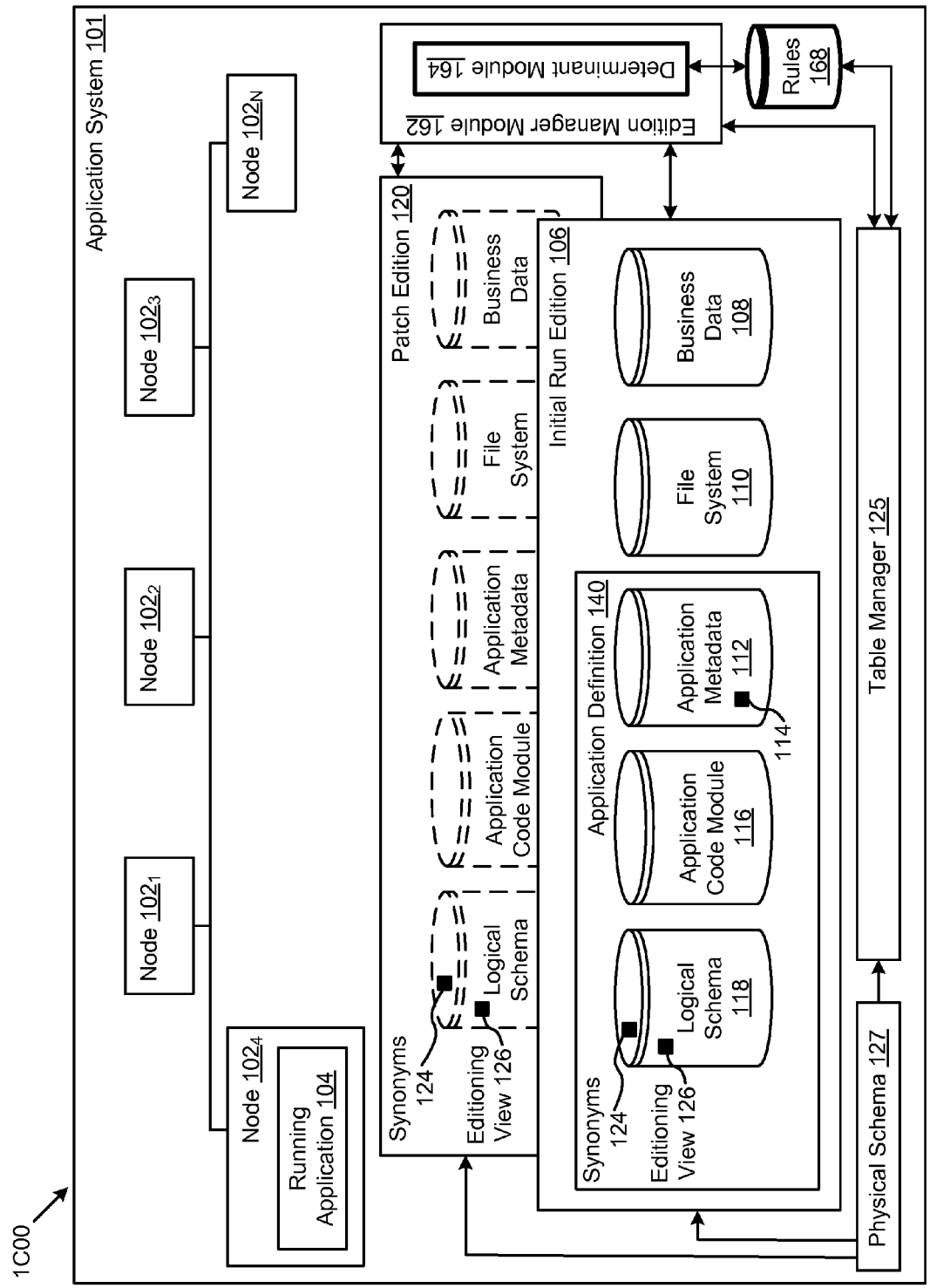
FIG. 1C is a diagram of an editioned database installation capable of transparently upgrading derived database objects, according to some embodiments.

FIG. 1C is a diagram of an editioned database installation 1C00 capable of transparently upgrading derived database objects. As an option, the present editioned database installation 1C00 may be implemented in the context of the architecture and functionality of the embodiments described herein. Also, the editioned database installation 1C00 or any aspect therein may be implemented in any desired environment.

As shown, the installation comprises an application system 101 (e.g., a cluster environment, a portion of a database engine, etc.) which in turn comprises computing nodes (e.g., node $102_1$, node $102_2$, node $102_3$, node $102_4$, node $102_N$, etc.) any of which computing nodes can communicate with any other of the computing nodes. A software application (e.g., running software application 104) executes on a computing node and accesses stored data (e.g., business data 108, one or more instances of a file system 110). A software application can also access stored data in various application-specific embodiments (e.g., application metadata 112, application code modules 116, and logical schema 118).

The application code modules 116 serve to store one or more copies of the software application, while the application metadata 112 serves to store data that is specific to the application (e.g., disjoint from the business data 108). The application metadata 112 can comprise application-specific data in the form of seed data 114, which can be used by the application to initialize data structures (e.g., screens, forms, menus, etc.) used by a running software application.

In addition to the editioned tables and views as discussed above, a particular collection of interrelated components in a database system (e.g., application metadata 112, application code modules 116, logical schema 118, business data 108, one or more instances of a file system 110, etc.) can be amalgamated into an "edition" (e.g., an initial run edition 106), which edition can then be subjected to transformations (e.g., data copies, data references, data conversions, etc.) into one or more other editions (e.g., patch edition 120), as shown.

In order to facilitate reducing downtime during upgrades of interrelated components in a database system, the collection of interrelated components are handled using the techniques disclosed herein. Strictly as an example, an instance of a running software application can access an initial run edition, or an instance of a running software application can access a patch edition. Various techniques for managing the timing and type of access are provided for by the editioning view 126 and by use of synonyms 124. For example, a synonym can be modified to refer to a logical schema of the initial run edition, or a synonym can be modified to refer to a logical schema of a patch edition.

As can be recognized by those skilled in the art, a first instance of a running software application can access and make changes to an initial run edition, and such changes can be detected and propagated to a patch edition using the cross-edition triggers. Thus, the second instance of the running software application can access the changes that had been propagated to the patch edition.

The various techniques for copying, referencing, transforming and otherwise managing the location (e.g., physical copy, virtual copy, etc.) of data as well as techniques for managing the timing and type of access observed by the running software application are discussed in detail infra "The Application"

A running installation of a suite of enterprise software applications comprises a vast and complex system made up of many individual parts that are broadly separated into a taxonomy as follows:
- A platform (e.g., storage hardware and software, servers, network components, OS, database hardware and software, middleware hardware and software, system management hardware and software, etc.), and
- One or more software applications (e.g., application code modules, application schema, code, application metadata, etc.).

Components within an installation can be further described as comprising:
- Application Schema—Application schema codifies a relational data model for accessing items stored in the application system 101 (e.g., tables, relationships, indexes, etc.). An instance of application schema defines the structure of the data being managed—it is not the data itself. The application schema is often managed while observing a two-layer approach comprising physical schema 127 and logical schema:
    - The physical schema describes how information is actually stored in database tables.
    - The logical schema is a stable view of the relevant parts of the physical schema presented to the application code modules. The logical schema is often defined in terms of the physical schema using synonyms, views, and access policies. In exemplary embodiments, the logical schema defines what is "seen" when an application code module connects to the relational data.
- Application Code Modules—These modules comprise executable logic that controls how the application operates. Instances of application code modules run on the database, middle-tier application servers, and in client devices. Application code modules can be written in a variety of programming and/or scripting languages.
- Application Metadata—This is data that participates in controlling how the application operates (e.g., initial look-and-feel, user customizations, etc.). This data can be stored in files on the file system, and/or in tables in a database. Metadata that is loaded into database tables is called "seed data". In some cases, metadata can be altered during application runtime. Users often edit application metadata to tailor functionality to their particular user-specific requirements.
- Business Data—This often refers to customer-owned transaction data or reference data that is stored in accordance with the application schema. Uses of patches as herein described can modify how business data is stored (e.g., corresponding to an instance of an application schema) however, the patching embodiments herein do not explicitly create or explicitly delete customer business data.

The techniques described herein provide for online patching of applications (and respective application data) as well as for the online patching and online transformation of business data (e.g., transformation to an updated application schema).

Application Editions

A collection of schema, code, and metadata definitions comprise an application definition 140. Components of the application definition may need to change over time, and the techniques herein prescribe how each part of the application definition are to be versioned and patched independently. Therefore, an application definition in a particular installation is known by a compound "version ID" comprised of the union of the versions of all of its constituent parts. An installed collection of versioned part definitions is referred to as an application edition. In exemplary cases, an application definition is stored both on the file system and in the database. Further it is typical to store multiple application editions within one installation, and in such cases both the file system and database are used to hold a run edition version and one or more patch edition versions of the application definition.

In some embodiments, an edition manager module 162 interfaces with a table manager 125 and manages interrelationships between an initial run edition 106 and a patch edition 120. In particular, an edition manager module may comprise a determinant module 164, which determinant module in turn reads rules 168 (further described in the discussion of FIG. 3).

In the context of the installation depicted and described in FIG. 1C, and following the purpose and definition of an edition and an edition's constituent components, a cycle can be followed so as to upgrade editions in a database system while maximizing the availability of the installation's functionality.

Figure 2:
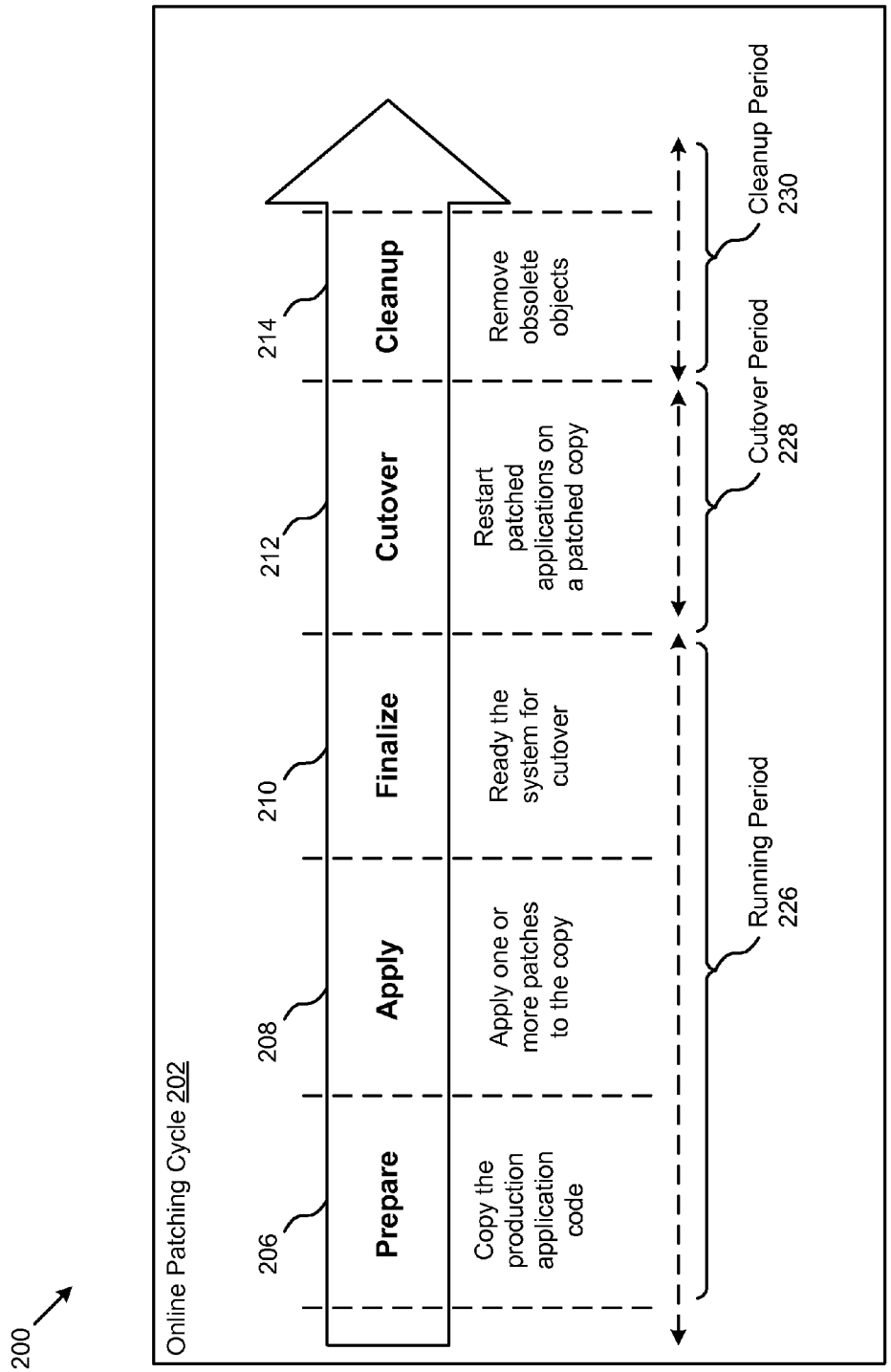
FIG. 2 is a cycle diagram showing an online patching cycle used in a system supporting transparently upgrading derived database objects, according to some embodiments.

FIG. 2 is a cycle diagram 200 showing an online patching cycle used in a system supporting transparently upgrading derived database objects. As an option, the present cycle diagram 200 may be implemented in the context of the architecture and functionality of the embodiments described herein. Also, the cycle diagram 200 or any aspect therein may be implemented in any desired environment.

To apply an online patch to an active/online installation, the installation is promoted through a series of sequential phases known as an online patching cycle. The shown online patching cycle 202 is given as:

PREPARE a patch edition (see online patch cycle prepare step 206).

APPLY a patch or patches to a patch edition (see online patch cycle apply step 208). Application of such patches can include operations to effect an "incremental code-level rebuild" and/or can include operations to effect an "incremental configuration-level rebuild".

FINALIZE to get the system ready for cutover (see online patch cycle finalize step 210). As an example, see the finalize portions of the process flow 1B00.

CUTOVER to patch edition (see online patch cycle cutover step 212):
  Shutdown software applications and application services.
  Set patch edition as the new run edition.
  Startup software applications and application services.

CLEANUP old objects and/or editions and/or superseded derived objects (see online patch cycle cleanup step 214).

As described in the above cycle, creating and patching relies on many specialized techniques to maintain a run edition (e.g., initial run edition 106) and one or more patch editions (e.g., patch edition 120) in the presence of continuously changing customer data in database tables (e.g., in the business data 108). The concept and implementation of "Edition-Based Redefinition" creates patch edition copies of application code modules and data in order to continuously apply patch transformations to runtime data that changes while the patch is executing.

The users can be all online users during the normal operation (e.g., during the running period 226), then for the brief period of the cutover (e.g., during the cutover period 228) the users are offline, to return online (e.g., in cleanup period 230) shortly after conclusion of the period of the cutover.

One embodiment supports full installation online patching. Some installations comprise many products (e.g., hundreds of software application configurations and many tens of thousands of tables). In such a case it is convenient to deploy every installation to contain all products (though only some may be licensed for a particular installation) and then to patch all products that are included in every installation. In this manner, all products can be periodically updated to stay current with the recommended code levels.

Figure 3:
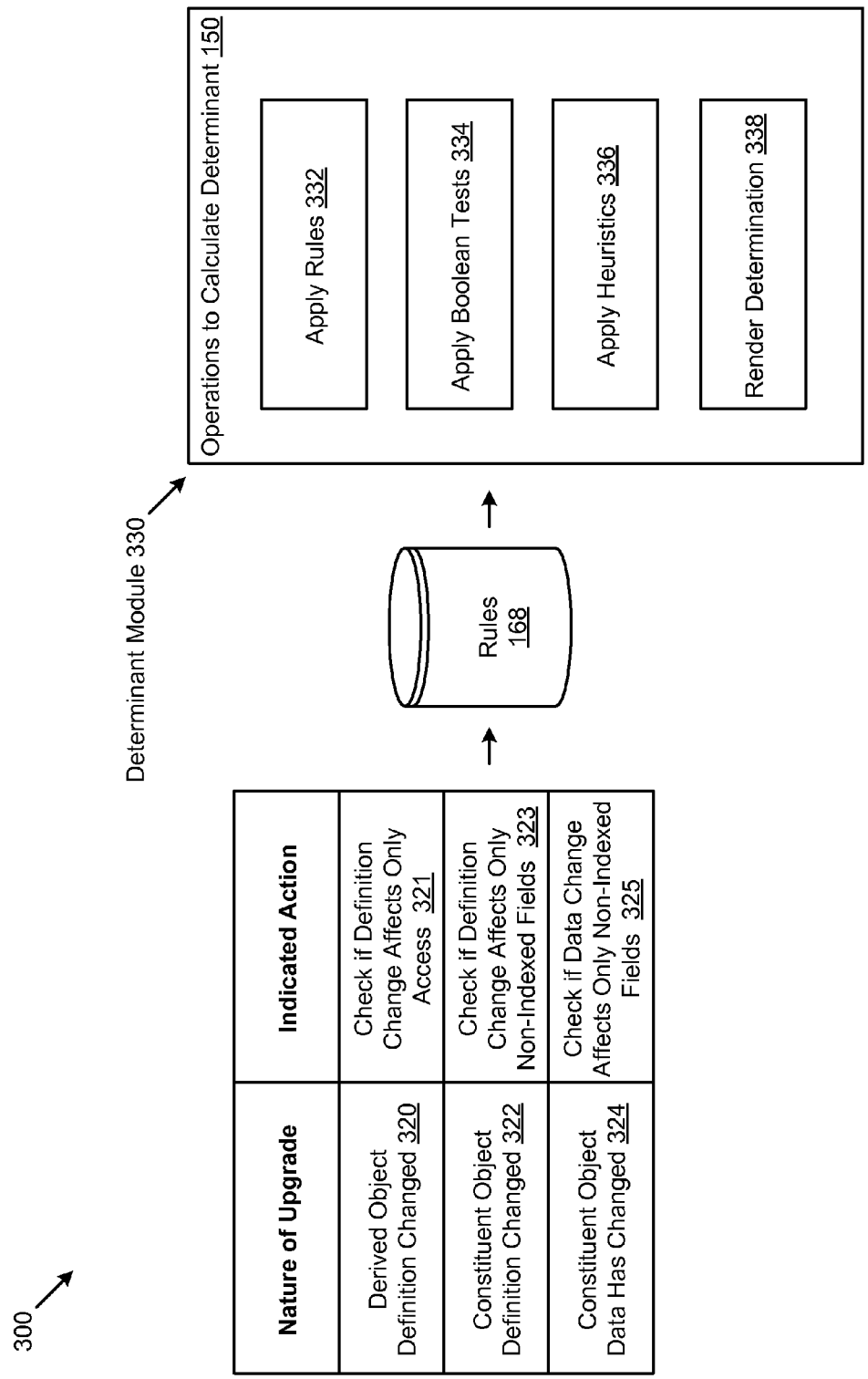
FIG. 3 is a diagram of a system for calculating a determinant when transparently upgrading derived database objects, according to some embodiments.

FIG. 3 is a diagram of a system 300 for calculating a determinant when transparently upgrading derived database objects. As an option, the present system 300 may be implemented in the context of the architecture and functionality of the embodiments described herein. Also, the system 300 or any aspect therein may be implemented in any desired environment.

As shown, system 300 comprises a database of rules 168, which rules include a data structure that maps the nature of an upgrade (e.g., an upgrade patch, and upgrade re-definition, etc.) to one or more indicated actions. For example, if a derived object definition is detected as having been changed (see change detector 320), then a possible indicated action might be to check if the new definition affects only access (see check 321). As another example, if a constituent object of a derived object changed (see change detector 322), then a possible indicated action might be to check if the new definition affects only non-indexed fields (see check 323). As another example, if a constituent object data has changed (see change detector 324), then a possible indicated action might be to check if the new definition affects only non-indexed fields (see check 325).

The rules (e.g., in the form of tests, change detectors, and checks) can be stored in a database, and the rules 168 can be read by a determinant module 330. Such a determinant module can be used to contain code or operational units to calculate determinants (see operations to calculate determinant). Further, such code or operational units can implement techniques to apply rules (see unit 332), for example, to perform nature tests and quantitative analysis, and perform checks, and can perform Boolean tests (see unit 334) for example, a Boolean test might be of the form: "if test1==TRUE and test2==TRUE then X else Y". Some embodiments apply heuristics 336. The resulting determinant (see operation 338) can be communicated using any known-in-the-art technique such as a subroutine return value, or a message, etc. In some cases the resulting determinant is accompanied by a regenerated derived object or a reference to a regenerated derived object. In other cases, the determinant returned merely indicates that the derived object need not be regenerated at the then current point in time. As can be seen, only the derived objects that need to be regenerated are in fact regenerated, thus the desired patch edition is more quickly made ready to enter the Cutover phase; unnecessary regeneration and/or unnecessary copies of derived data are avoided.

There are many other approaches to calculating a determinant. One exemplary technique for calculating a determinant is to resolve the logical definition into a corresponding canonical physical definition. Strictly as examples, logic from referenced code objects such as views are incorporated into the logical definition, producing a definition without any external code references. Further, references to synonyms, logical tables and logical columns are resolved to their ultimate physical storage tables and columns. Then, the resulting physical definition is codified into a sorted canonical physical definition, where such codification into a canonical physical definition eliminates variances in formatting, variances in naming, and variances in expression ordering, such that functionally equivalent logical definitions will have exactly the same canonical physical definitions.

In one embodiment, the canonical representation (e.g., canonical physical definition) based on the patch edition derived object definition is considered as a candidate, which candidate is then compared with the canonical physical definition of the existing (e.g., pre-patch) derived object implementation using a simple string equality test. If the definitions are equal, the derived object implementation might not need to be regenerated at least it might not need to be regenerated based solely on their respective canonical representations.

Additional Embodiments of the Disclosure

Figure 4:
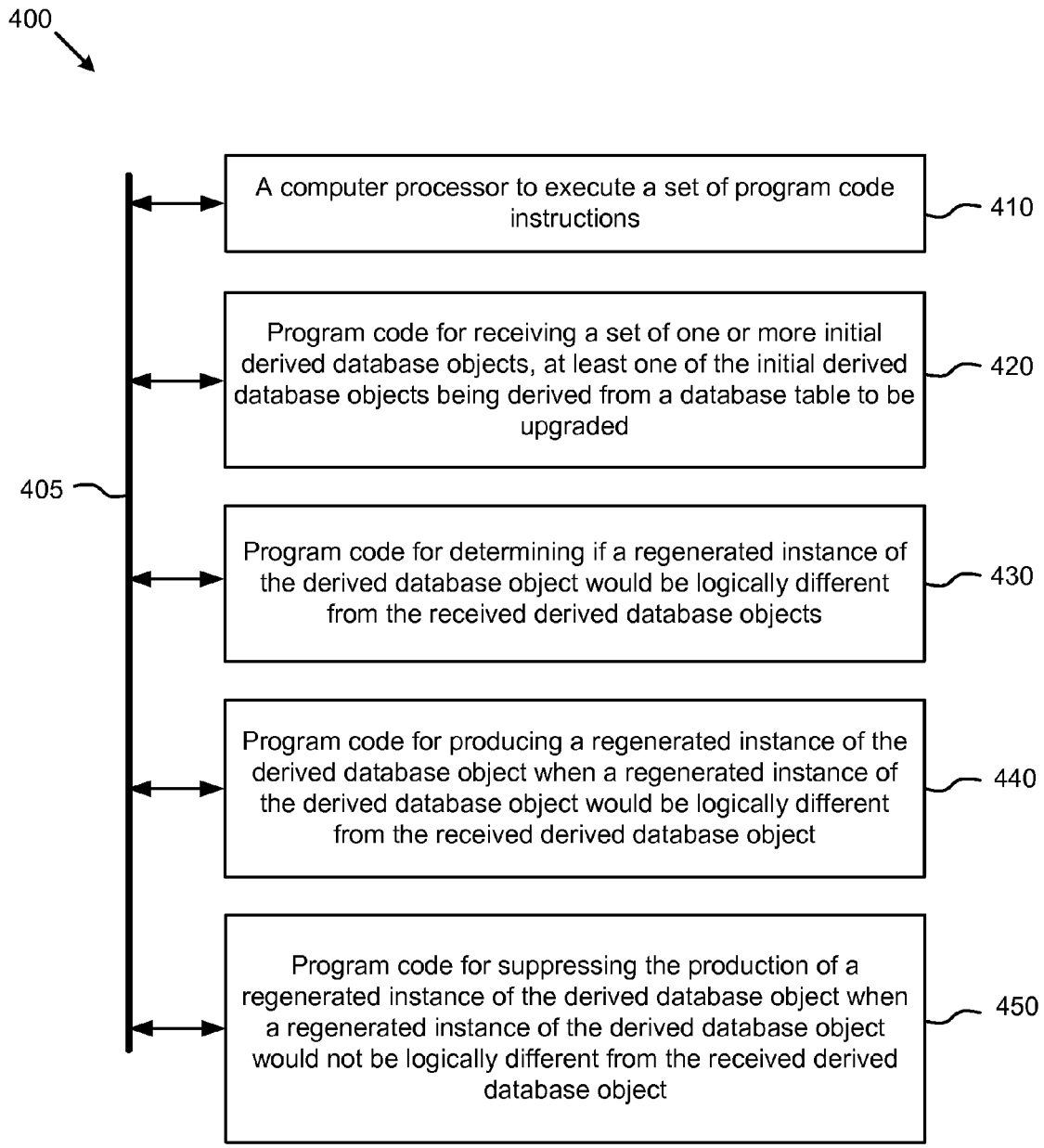
FIG. 4 is a diagram of a computer-implemented system for transparently upgrading derived database objects, according to some embodiments.

FIG. 4 is a diagram of a computer-implemented system 400 for transparently upgrading derived database objects. As an option, the present system 400 may be implemented in the context of the architecture and functionality of the embodiments described herein. Of course, however, the system 400 or any operation therein may be carried out in any desired environment.

As shown, system 400 comprises at least one processor and at least one memory, the memory serving to store program instructions corresponding to the operations of the system. As shown, an operation can be implemented in whole or in part using program instructions accessible by a module. The modules are connected to a communication path 405, and any operation can communicate with other operations over communication path 405. The modules of the system can, individually or in combination, perform method operations within system 400. Any operations performed within system 400 may be performed in any order unless as may be specified in the claims. The embodiment of FIG. 4 implements a portion of a computer system, shown as system 400, comprising a computer processor to execute a set of program code instructions (see module 410) and modules for accessing memory to hold program code instructions to perform: receiving a set of one or more initial derived database objects, at least one of the initial derived database objects being derived from a database table to be upgraded (see module 420); determining if a regenerated instance of the derived database object would be logically different from the received derived database objects (see module 430); producing a regenerated instance of the derived database object when a regenerated instance of the derived database object would be logically different from the received derived database object (see module 440); and suppressing the production of a regenerated instance of the derived database object when a regenerated instance of the derived database object would not be logically different from the received derived database object (see module 450).

Figure 5:
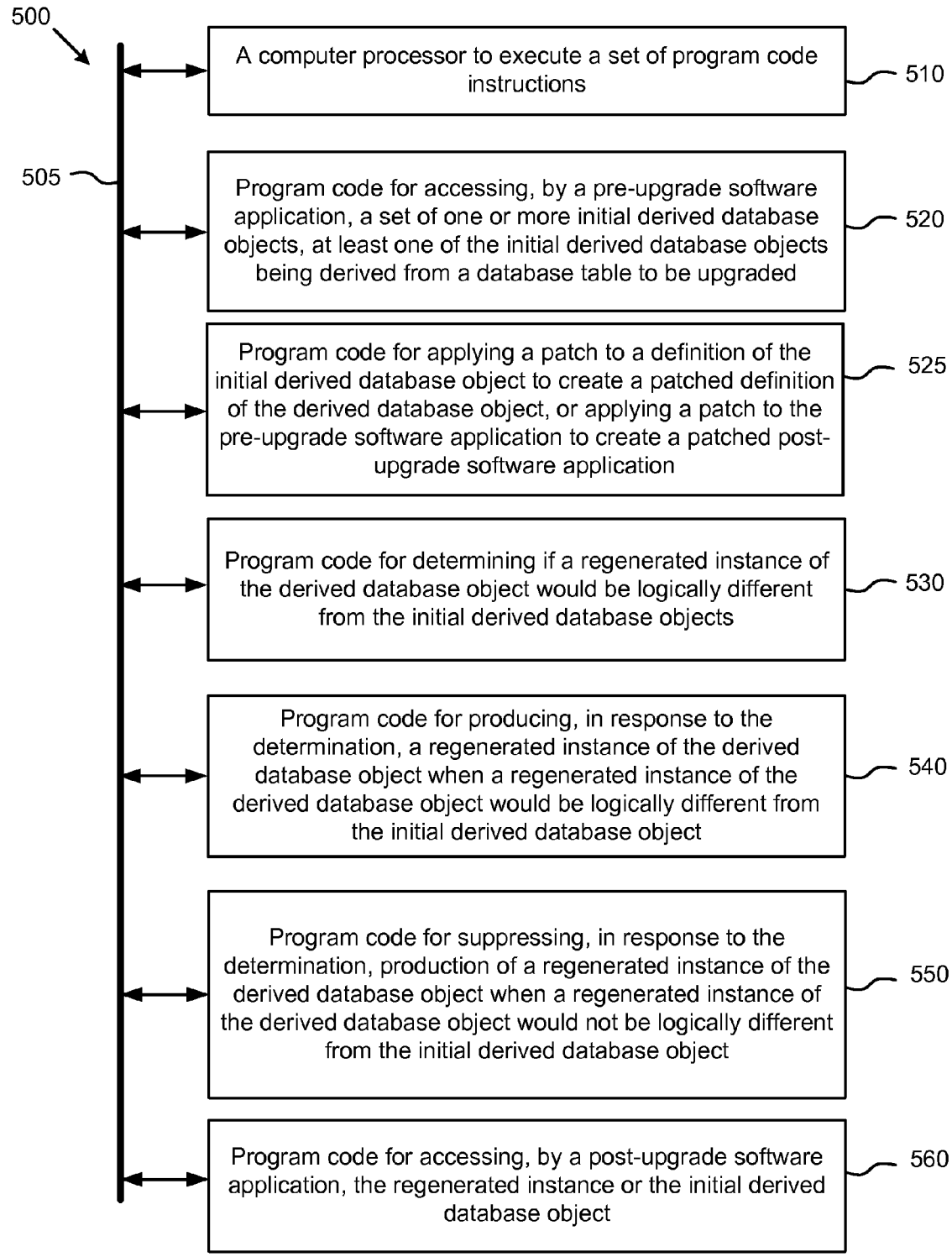
FIG. 5 is a diagram of a computer-implemented system for transparently upgrading derived database objects, according to some embodiments.

FIG. 5 is a diagram of a computer-implemented system 500 for transparently upgrading derived database objects. As an option, the present system 500 may be implemented in the context of the architecture and functionality of the embodiments described herein. Of course, however, the system 500 or any operation therein may be carried out in any desired environment. As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims. The embodiment of FIG. 5 implements a portion of a computer system, shown as system 500, comprising a computer processor to execute a set of program code instructions (see module 510) and modules for accessing memory to hold program code instructions to perform: accessing, by a pre-upgrade software application, a set of one or more initial derived database objects, at least one of the initial derived database objects being derived from a database table to be upgraded (see module 520). Processing may further comprise applying a patch to a definition of the initial derived database object to create a patched definition of the derived database object, or applying a patch to the pre-upgrade software application to create a patched post-upgrade software application (see module 525), and then determining if a regenerated instance (e.g., post patch) of the derived database object would be logically different from the initial derived database objects (see module 530); and if so, then producing, in response to the determination, a regenerated instance of the derived database object when a regenerated instance of the derived database object would be logically different from the initial derived database object (see module 540). Or it can happen that regeneration is unnecessary (see at least the operations of module 550), and accordingly, suppressing the production of a regenerated instance of the derived database object (e.g., when a regenerated instance of the derived database object would not be logically different from the initial derived database object). Further steps (see module 560) can include accessing, by a post-upgrade software application, the regenerated instance (if it was regenerated) or the initial derived database object (if regeneration was suppressed).

System Architecture Overview

Figure 6:
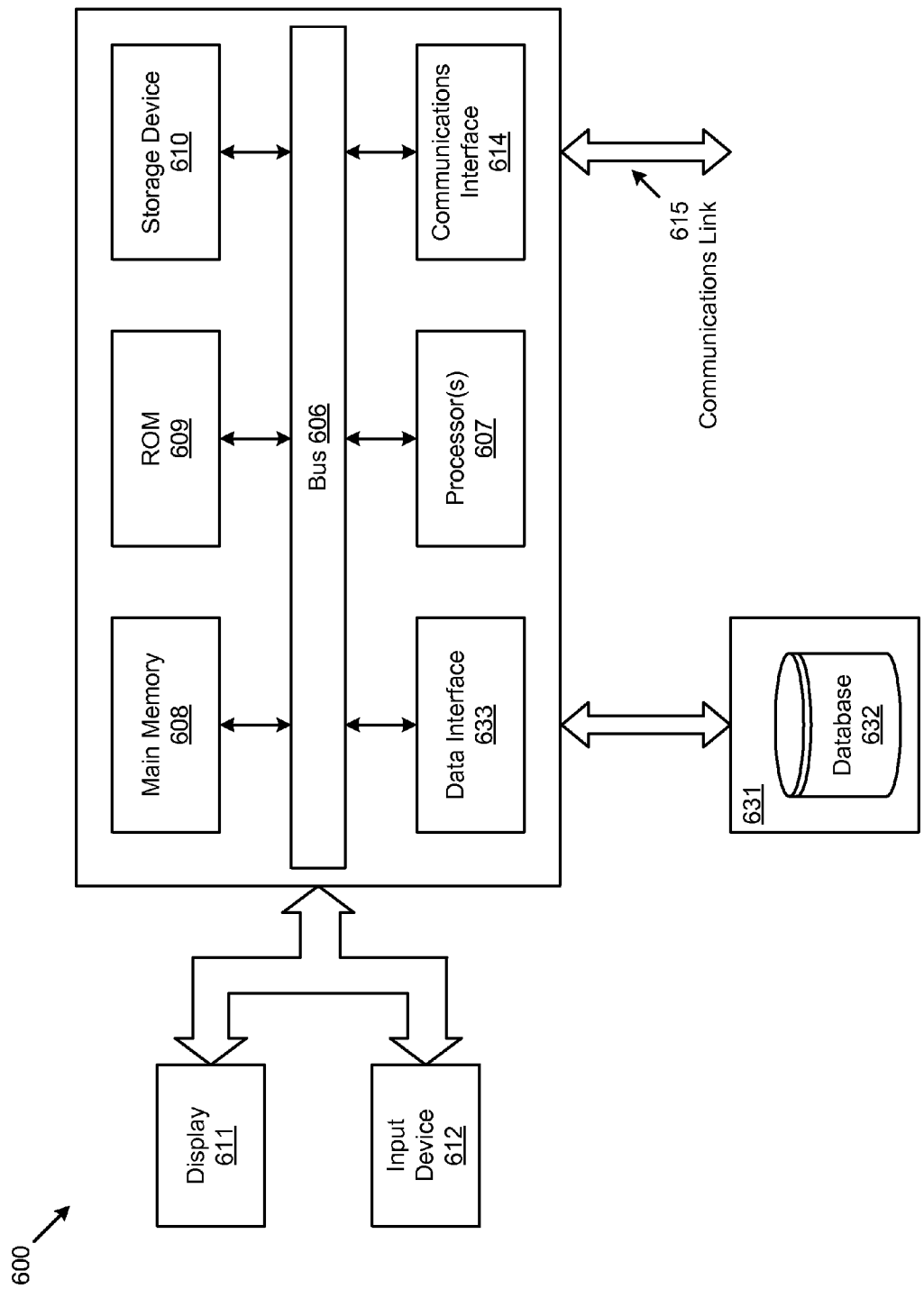
FIG. 6 depicts a block diagram of an instance of a computer system suitable for implementing an embodiment of the present disclosure.

FIG. 6 depicts a block diagram of an instance of a computer system 600 suitable for implementing an embodiment of the present disclosure. Computer system 600 includes a bus 606 or other communication mechanism for communicating information, which interconnects subsystems and devices, such as a processor 607, a system memory 608 (e.g., RAM), a static storage device (e.g., ROM 609), a disk drive 610 (e.g., magnetic or optical), a data interface 633, a communication interface 614 (e.g., modem or Ethernet card), a display 611 (e.g., CRT or LCD), input devices 612 (e.g., keyboard, cursor control), and an external data repository 631.

According to one embodiment of the disclosure, computer system 600 performs specific operations by processor 607 executing one or more sequences of one or more instructions contained in system memory 608. Such instructions may be read into system memory 608 from another computer readable/usable medium, such as a static storage device or a disk drive 610. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 600. According to certain embodiments of the disclosure, two or more computer systems 600 coupled by a communications link 615 (e.g., LAN, PTSN, or wireless network) may perform the sequence of instructions required to practice the disclosure in coordination with one another.

Computer system 600 may transmit and receive messages, data, and instructions, including programs (e.g., application code), through communications link 615 and communication interface 614. Received program code may be executed by processor 607 as it is received, and/or stored in disk drive 610 or other non-volatile storage for later execution. Computer system 600 may communicate through a data interface 633 to a database 632 on an external data repository 631. A module as used herein can be implemented using any mix of any portions of the system memory 608, and any extent of hard-wired circuitry including hard-wired circuitry embodied as a processor 607.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for transparently upgrading derived database objects, the method comprising:
   accessing, by a pre-upgrade software application, a set of one or more initial derived database objects, at least one of the initial derived database objects being derived from a database table to be upgraded;
   determining if a regenerated instance of the derived database object would be logically different from the initial derived database objects; and
      producing, in response to the determination, a regenerated instance of the derived database object when a regenerated instance of the derived database object would be logically different from the initial derived database object; or
      suppressing, in response to the determination, production of a regenerated instance of the derived database object when a regenerated instance of the derived database object would not be logically different from the initial derived database object; then
      accessing, by a post-upgrade software application, the regenerated instance or the initial derived database object.

2. The method of claim 1, further comprising applying a patch to a definition of the initial derived database object to create a patched definition of the derived database object, or applying a patch to the pre-upgrade software application to create a patched post-upgrade software application.

3. The method of claim 2, wherein, the determination applies heuristics that are based at least in part on the definition of the derived database object.

4. The method of claim 3, further comprising determining if the definition of the derived database object comprises only non-indexed fields.

5. The method of claim 1, wherein, the determination applies heuristics that are based at least in part on contents of the database table to be upgraded.

6. The method of claim 1, wherein the determination applies at least one of, a coarse-grained rule, a fine-grained rule, a Boolean test.

7. The method of claim 1, wherein the determination compares canonical representations.

8. A computer system for transparently upgrading derived database objects, comprising:
   a computer processor to execute a set of program code instructions; and
   a memory to hold the program code instructions, in which the program code instructions comprises program code to perform,
   accessing, by a pre-upgrade software application, a set of one or more initial derived database objects, at least one of the initial derived database objects being derived from a database table to be upgraded;
   determining if a regenerated instance of the derived database object would be logically different from the initial derived database object; and
      producing, in response to the determination, a regenerated instance of the derived database object when a regenerated instance of the derived database object would be logically different from the initial derived database object; or
      suppressing, in response to the determination, production of a regenerated instance of the derived database object when a regenerated instance of the derived database object would not be logically different from the initial derived database object; then
      accessing, by a post-upgrade software application, the regenerated instance or the initial derived database object.

9. The computer system of claim 8, further comprising program code for applying a patch to a definition of the initial derived database object to create a patched definition of the derived database object, or applying a patch to the pre-upgrade software application to create a patched post-upgrade software application.

10. The computer system of claim 9, wherein, the determination applies heuristics that are based at least in part on the definition of the derived database object.

11. The computer system of claim 10, further comprising program code for determining if the definition of the derived database object comprises only non-indexed fields.

12. The computer system of claim 8, wherein, the determination applies heuristics that are based at least in part on contents of the database table to be upgraded.

13. The computer system of claim 8, wherein the determination applies at least one of, a coarse-grained rule, a fine-grained rule, a Boolean test.

14. The computer system of claim 8, wherein the determination compares canonical representations.

15. A computer program product embodied in a non-transitory computer readable medium, the computer readable medium having stored thereon a sequence of instructions which, when executed by a processor causes the processor to execute a process to implement transparently upgrading derived database objects, the process comprising:
   accessing, by a pre-upgrade software application, a set of one or more initial derived database objects, at least one of the initial derived database objects being derived from a database table to be upgraded;

determining if a regenerated instance of the derived database object would be logically different from the initial derived database object; and producing, in response to the determination, a regenerated instance of the derived database object when a regenerated instance of the derived database object would be logically different from the initial derived database object; or suppressing, in response to the determination, production of a regenerated instance of the derived database object when a regenerated instance of the derived database object would not be logically different from the initial derived database object; then accessing, by a post-upgrade software application, the regenerated instance or the initial derived database object.

16. The computer program product of claim 15, further comprising instructions for applying a patch to a definition of the initial derived database object to create a patched definition of the derived database object, or applying a patch to the pre-upgrade software application to create a patched post-upgrade software application.

17. The computer program product of claim 16, wherein, the determination applies heuristics that are based at least in part on the definition of the derived database object.

18. The computer program product of claim 17, further comprising instructions for determining if the definition of the derived database object comprises only non-indexed fields.

19. The computer program product of claim 15, wherein, the determination applies heuristics that are based at least in part on contents of the database table to be upgraded.

20. The computer program product of claim 15, wherein the determination compares canonical representations.

* * * * *